United States Patent [19]

Mottate

[11] Patent Number: 4,917,508
[45] Date of Patent: Apr. 17, 1990

[54] THIN LINEAR MOTION ROLLING GUIDE UNIT

[75] Inventor: Tatsuo Mottate, Tokyo, Japan

[73] Assignee: Nippon Thompson Co. Ltd., Tokyo, Japan

[21] Appl. No.: 245,671

[22] Filed: Sep. 19, 1988

[30] Foreign Application Priority Data

Dec. 23, 1987 [JP] Japan .................. 62-195367[U]

[51] Int. Cl.$^4$ ............................................. F16C 29/06
[52] U.S. Cl. ................................................... 384/45
[58] Field of Search .......................... 384/45, 43, 44; 464/168

[56] References Cited

U.S. PATENT DOCUMENTS

| | | | |
|---|---|---|---|
| 4,593,957 | 6/1986 | Hidano | 384/49 |
| 4,701,057 | 10/1987 | Kashiwabara | 384/43 |
| 4,701,058 | 10/1987 | Mottate | 384/45 |
| 4,799,806 | 1/1989 | Seki | 384/45 |

Primary Examiner—Lenard A. Footland
Attorney, Agent, or Firm—Vaden, Eickenroht, Thompson & Boulware

[57] ABSTRACT

There is provided a thin linear motion rolling guide unit comprising: a rail made of a long member having a U-shaped cross section in which first track grooves are respectively formed on the inside surfaces of both side walls in the longitudinal direction of the long member; a table which is slidably combined with the rail and has a pair of track members, second track grooves being formed on the outside surfaces of the track members at the positions which face the first track grooves of the rail and endless circulating passages for balls being also formed by the track members; the balls which are inserted between the first track groove of the rail and the second track groove of the table which faces the rail; flat plate shaped upper and lower lids attached in the upper and lower portions of the table so as to sandwich the track members which are symmetrically arranged with respect to an axial direction of the table; the track members forming loop inside wall surfaces of the endless circulating passages for the rolling members which are formed in the table; and a circulator provided between the track members symmetrically arranged, the circulator forming outside wall surfaces of the endless circulating passages, wherein the circulator is combined with the upper and lower lids and fixed, thereby constructing an endless circulating passage complete loop for the balls.

6 Claims, 3 Drawing Sheets 4,917,508

THIN LINEAR MOTION ROLLING GUIDE UNIT

BACKGROUND OF THE INVENTION

1. Field of the Invention

The present invention relates to a table of a thin linear motion rolling guide unit and, more particularly, to a cheap and light-weighted linear motion rolling guide unit.

2. Description of the Related Background Art

Most of conventional thin linear motion rolling guide units are so small that the whole unit can be put on the palm. They are used in information processing apparatuses, measuring instruments, and the like. This kind of linear motion rolling guide unit has a structure such that both of the table and the rail which is combined therewith have almost U-shaped cross sections and they are combined through balls and relatively moved in their axial direction.

An alloy steel is frequently used as a material of their track members and these track members are small. Therefore, the front surfaces of the track members are hardened by a thermal process, so that there are drawbacks such that the unnecessary portions are also hardened and the cost eventually increases.

On the other hand, the whole linear motion rolling guide unit is heavy because of a steel material. There is a problem such that, particularly, if the table as the track member to be moved is heavy, the repetitive linear motion rolling guiding accuracy is deteriorated due to the inertial force which acts when the table stops.

SUMMARY OF THE INVENTION

It is an object of the present invention to solve the foregoing problems and to provide a cheap linear motion rolling guide unit in which the accuracy and intensity and the like which are certainly necessary as a linear motion rolling guide unit are assured and the weight of the whole unit is lightened and the unit can be easily assembled.

This object is accomplished by a thin linear motion rolling guide unit comprising: a rail made of a long member having a U-shaped cross section in which first track grooves are respectively formed on the inside surfaces of both side walls in the longitudinal direction of the long member; a table which is slidably combined with the rail and has a pair of track members, second track grooves being formed on the outside surfaces of the track members at the positions which face the first track grooves of the rail and endless circulating passages for balls being also formed by the track members; the balls which are inserted between the first track groove of the rail and the second track groove of the table which faces the rail; flat plate shaped upper and lower lids attached in the upper and lower portions of the table so as to sandwich the track members which are symmetrically arranged with respect to an axial direction of the table; the track members forming loop inside wall surfaces of the endless circulating passages for the rolling members which are formed in the table; and a circulator provided between the track members symmetrically arranged, the circulator forming outside wall surfaces of the endless circulating passages, wherein the circulator is combined with the upper and lower lids and fixed, thereby constructing an endless circulating passage complete loop for the balls.

A rivet is used as a fixing device of each part of the table.

According to the present invention, the following advantages are derived.

(1) The track grooves of the table can be easily worked and the track surfaces can be finished with a high working precision, so that the slide resistance of the linear motion rolling guide unit can be reduced.

(2) Since the track members are separately provided, various kinds of materials can be combined in accordance with the use conditions and the individual material suitable for the use can be selected.

(3) The linear motion rolling guide unit can be cheaply manufactured.

The above and other objects and features of the present invention will become apparent from the following detailed description and the appended claims with reference to the accompanying drawings.

DETAILED DESCRIPTION OF A PREFERRED EMBODIMENT

Figure 1:
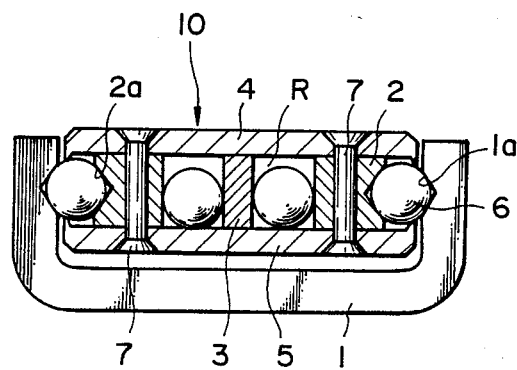
FIG. 1 is a front view showing a thin linear motion rolling guide unit in an embodiment of the present invention.

FIG. 1 is a front view of a thin linear motion rolling guide unit showing an embodiment of the present invention. A rail 1 serving as a bed is generally made of a thin steel and its front surface is hardened by a thermal process.

The thin linear motion rolling guide unit according to the invention mainly comprises: the rail 1 formed with track grooves 1a on the inside surfaces of both side wall surfaces of a long member having an almost U-shaped cross section; a table 10 adapted to be combined with the rail 1 so as to be enclosed therein; and a number of balls 6 which are interposed between the rail 1 and the table 10. Track grooves 2a are formed on the outside wall surfaces of the table 10 which faces the track grooves 1a of the rail 1 so as to face the track grooves 1a. The balls 6 are inserted between the track grooves 1a and 2a. The rail 1 and table 10 are relatively linearly moved through the balls 6.

The table 10 comprises: almost rectangular pole shaped track members 2 which form the track grooves 2a adapted to receive the load in contact with the balls 6 and loop inside wall surfaces 2c (refer to FIG. 3) of an endless circulating passage to circulate the balls 6; and a circulator 3 which forms loop outside wall surfaces 3c of the endless circulating passage. The whole table is assembled by flat plate shaped upper and lower lids 4 and 5 and rivets 7 and 8 (also refer to FIG. 2) so that those components are assembled in a predetermined positional relation. Then, they are fixed with each other.

Figure 2:
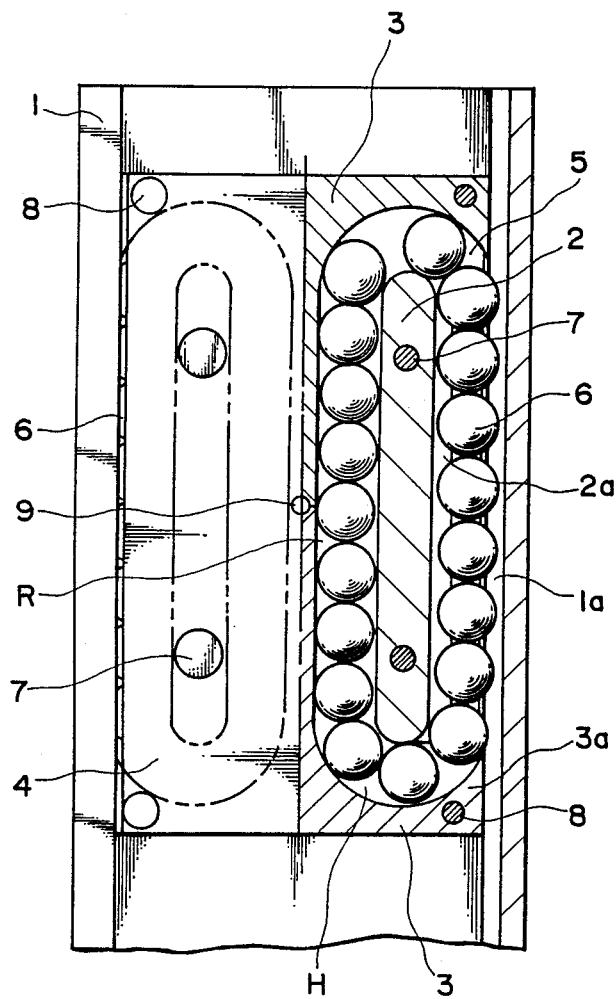
FIG. 2 is a plan view of FIG. 1, in which the right half portion shows a cross sectional view taken along the center line of balls in track grooves in the sliding direction.

FIG. 2 is a plan view of FIG. 1. The right half portion of the table 10 shows a cross sectional view taken along the center line of the balls in the track grooves in the sliding direction. Only the track members 2 are made of a steel plate and their front surface are hardened by a thermal process. The other members can be made of a synthetic resin, light metal, or steel which is not hardened in accordance with the use conditions.

With this structure, the manufacturing unit cost of each part can be reduced and the linear motion rolling guide unit can be easily assembled without deteriorating the linear motion rolling guiding precision of the product.

The rivets 7 and 8 have been used as fixing devices to fix the track members 2 and circulator 3 by the upper and lower lids 4 and 5 in this embodiment. The rivets 7 are used to fix the track grooves 2. The rivets 8 are used to fix the circulator 3.

In the diagram, reference numeral 3a denotes a scooping portion of the balls 6, R indicates a return passage, and H represents a direction turning passage.

Figure 3:
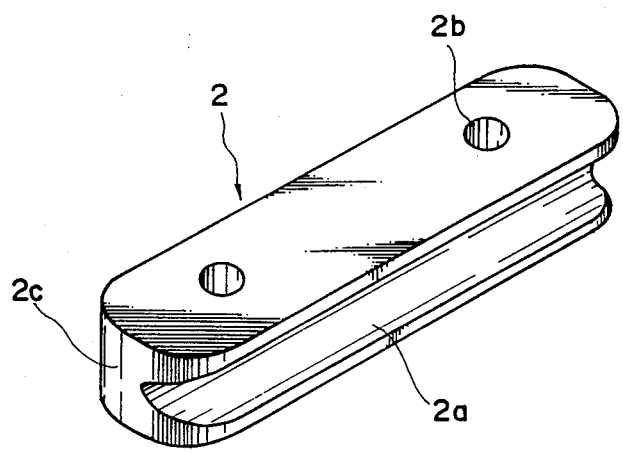
FIG. 3 is a perspective view showing a track member of the invention.

FIG. 3 is a perspective view showing a track member of the invention. The single track groove 2a is formed on the outside wall surface of the track groove 2 in the longitudinal direction. Subsequent to the track groove 2a, the inner wall surface of the direction turning passage H and the inner wall surface of the return passage R are provided, thereby forming the inside wall surface 2c of the endless circulating passage loop. Reference numeral 2b denotes attaching holes of the rivets 7.

In this embodiment, the table 10 has two endless circulating passages in the axial direction. However, it will be apparently understood that the inner wall surfaces of the respective loops can be constructed by symmetrically arranging the track members of the same shape with respect to the axial direction.

In the embodiment, since the track members 2 have been separately formed, only these portions can be specially worked and the working precision can be raised.

Figure 4:
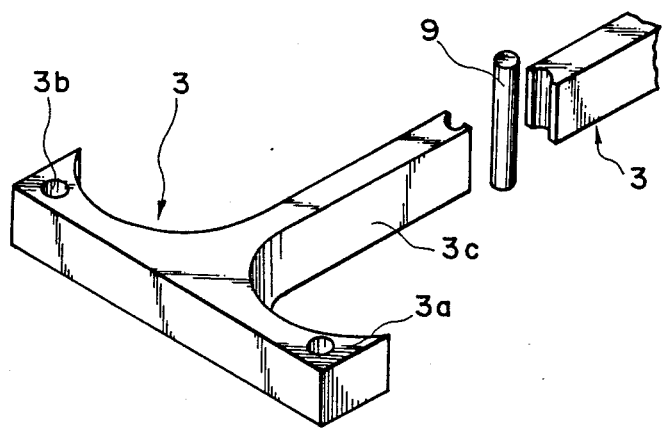
FIG. 4 is a perspective view showing a circulator of the invention.

FIG. 4 is a perspective view of the circulator 3. The circulator 3 has an almost T-character shape. The lower ends of a pair of T-shaped circulators 3 are come into contact with each other, thereby constructing an almost I-shaped member as a whole. This united member is fixed between the track members and the outside wall surfaces 3c of the right and left endless circulating passage loops for the balls 6 are formed. Reference numeral 3b denotes attaching holes of the rivets 8.

A semicircular notched portion is formed in the lower end contacting portion of each circulator 3. By combining the circulators 3, a circular space is formed therebetween at the intermediate position. A knock pin 9 fixed to the upper and lower lids 4 and 5 which are attached to the table 10 is fitted into the circular space, thereby positioning the circulators 3 and preventing the deformation thereof.

Since the circulators 3 are vertically symmetrical, the same two circulators can be used as the upper and lower circulators 3.

On the other hand, the circulators 3 can be also integrally formed as a single part so as to have an almost I-character shape in accordance with the specifications. In this case, a circular space or hole is also formed at the intermediate position of this member and the knock pin 9 is fitted into this hole in a manner similar to the above.

As described above, according to the invention, there are many practical advantages such that the weight of the table is reduced, the repetitive linear motion rolling guiding precision of the thin linear motion rolling guide unit is improved, the parts of the unit can be easily assembled and worked, the costs are reduced, further, the materials of the parts can be freely selected in accordance with the use condition, and the like.

Although only a practical example in which the balls are used as a rolling members has been shown in the drawings, rollers can be also used in place of the balls.

The present invention is not limited to the foregoing embodiment but many modifications and variations are possible within the spirit and scope of the appended claims of the invention.

What is claimed is:

1. A thin linear motion rolling guide unit comprising:
a rail (1) made of a long member having a U-shaped cross section in which first track grooves (1a) are respectively formed on inside surfaces of both side walls in the longitudinal direction of said long member;
a table (10) which is slidably combined with said rail (1) and has a pair of track members (2), second track grooves (2a) being formed on the outside surfaces of said track members (2) at the positions which face said first track grooves (1a) of the rail (1) and endless circulating passages for a number of rolling members (6) being also formed by the track members (2);
the rolling members (6) which are inserted between the first track groove (1a) of the rail (1) and the second track groove (2a) of the table (10) which faces the rail;
flat plate shaped upper and lower lids (4 and 5) which are attached in the upper and lower portions of the table (10) so as to sandwich the track members (2) which are symmetrically arranged with respect to an axial direction of the table;
said track members (2) forming loop inside wall surfaces (2c) of the endless circulating passages for the rolling members (6) which are formed in said table (10); and
a circulator (3) provided between the track members (2) which are symmetrically arranged, said circulator (3) forming outside wall surfaces (3c) of the endless circulating passages,
wherein said circulator (3) is combined with said upper and lower lids (4 and 5) and fixed, thereby constructing an endless circulating passage complete loop for the rolling members (6).

2. A unit according to claim 1, wherein rivets are used as means for fixing each part of said table (10).

3. A unit according to claim 1, wherein said circulator (3) consists of a pair of upper and lower same members each having an almost T-character shape, a hole having an almost semicircular cross section is formed in the lower end portion of each of said members, these members are combined so that said holes face each other, a knock pin (9) is fitted into the resultant circular hole, and the combined circulator (3) is sandwiched and fixed between said flat-shaped upper and lower lids (4 and 5).

4. A unit according to claim 3, wherein said circulator (3) is formed by a single member having an almost I-character shape.

5. A unit according to claim 1, wherein said rolling members (6) are balls.

6. A unit according to claim 1, wherein said rolling members (6) are rollers.

* * * * *